(12) United States Patent
Candelore

(10) Patent No.: US 11,962,719 B2
(45) Date of Patent: Apr. 16, 2024

(54) REAL TIME VERIFICATION OF CALLER IDENTIFICATION (ID)

(71) Applicant: SONY GROUP CORPORATION, Tokyo (JP)

(72) Inventor: Brant Candelore, Poway, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/890,726

(22) Filed: Aug. 18, 2022

(65) Prior Publication Data

US 2024/0064233 A1   Feb. 22, 2024

(51) Int. Cl.
*H04M 3/436* (2006.01)
*H04M 3/42* (2006.01)

(52) U.S. Cl.
CPC ....... *H04M 3/436* (2013.01); *H04M 3/42034* (2013.01)

(58) Field of Classification Search
CPC .......................... H04M 3/436; H04M 3/42034
USPC ...................................................... 379/142.05
See application file for complete search history.

(56) References Cited

U.S. PATENT DOCUMENTS

| | | | |
|---|---|---|---|
| 8,892,673 B1 | 11/2014 | Emigh et al. | |
| 9,020,117 B2* | 4/2015 | Caceres | H04M 3/436 379/201.02 |
| 9,125,057 B2 | 9/2015 | Neal et al. | |
| 9,232,056 B2* | 1/2016 | Liu | H04M 3/4365 |
| 10,721,352 B2* | 7/2020 | Sharpe | H04M 3/4365 |
| 11,102,347 B1 | 8/2021 | Isgar | |
| 11,496,899 B1* | 11/2022 | Koster | H04M 3/436 |
| 2007/0033256 A1* | 2/2007 | Ben-Itzhak | G06Q 10/107 709/206 |
| 2015/0180812 A1 | 6/2015 | Wilson | |
| 2017/0339277 A1* | 11/2017 | Lewinson | H04M 3/53341 |
| 2020/0068477 A1* | 2/2020 | Awada | H04W 48/12 |
| 2021/0195383 A1* | 6/2021 | Kato | H04W 4/12 |

FOREIGN PATENT DOCUMENTS

| | | |
|---|---|---|
| CN | 106550155 B | 5/2019 |
| WO | 2008/015669 A2 | 2/2008 |

* cited by examiner

*Primary Examiner* — Binh Kien Tieu
(74) *Attorney, Agent, or Firm* — CHIP LAW GROUP

(57) ABSTRACT

An electronic device and method for real-time verification of Caller IDs for live-human and robot call filtering is provided. A first electronic device receives an incoming first call from a second electronic device associated with a Caller identification (ID). The first electronic device transmits a verification text message to the second electronic device using the Caller ID, while the first call is still incoming. The first electronic device receives a response to the verification text message and compares the received response with a pre-defined response. If the response is correct and received within a predefined time, the first electronic device allows the call to connect. If a correct response is received beyond the predefined time, the Caller ID is added to a whitelist so that a next call from the same Caller ID is received automatically. In such case, the current first call is redirected to a voicemail system.

20 Claims, 4 Drawing Sheets

REAL TIME VERIFICATION OF CALLER IDENTIFICATION (ID)

CROSS-REFERENCE TO RELATED APPLICATIONS/INCORPORATION BY REFERENCE

This Application makes reference to U.S. application Ser. No. 16/914,634, which was filed on Jun. 29, 2020 and granted as U.S. Pat. No. 11,108,908 B1. The above stated Patent Application is hereby incorporated herein by reference in its entirety.

FIELD

Various embodiments of the disclosure relate to filtering out of calls with fake Caller identification (ID). More specifically, various embodiments of the disclosure relate to an electronic device and method for real-time verification of a Caller ID to filter a call while the call is still incoming.

BACKGROUND

With the advancements in the field of telecommunication, various techniques have been developed to make live-human and robot calls using falsified Caller ID numbers. Robot calls may use auto-dialers and recorded messages, and are called "robocalls". Auto-dialers may use equipment and computer software to dial phone numbers without human intervention. Such calls usually deliver telemarketing messages and can be annoying to the recipient of the calls. In certain countries, express consent is required from consumers for certain types of calls such as, telemarketing calls. Certain countries also provide for do not disturb registers and may impose penalties or fines in case unsolicited calls are made illegally and willfully. However, since the Caller IDs are falsified, e.g. bogus, the calls may not be easily traceable, and so the calls may be made with impunity. Telemarketers rely on the falsification of Caller IDs to avoid the fines and penalties. Solutions to blacklist Caller ID numbers are ineffective since the Caller IDs may be completely made up and there is a large pool of Caller IDs to draw from. So, if a particular Caller ID is blacklisted, e.g. resulting in a call being blocked, it may be easy for the telemarketers to switch to a different number. The numbers do not even have to be valid working phone numbers. Further, solutions that allow calls with whitelisted Caller IDs may be problematic as there may be often unanticipated legitimate callers whose numbers cannot be placed in the whitelist ahead of time.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for real-time verification of Caller identification (ID) is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
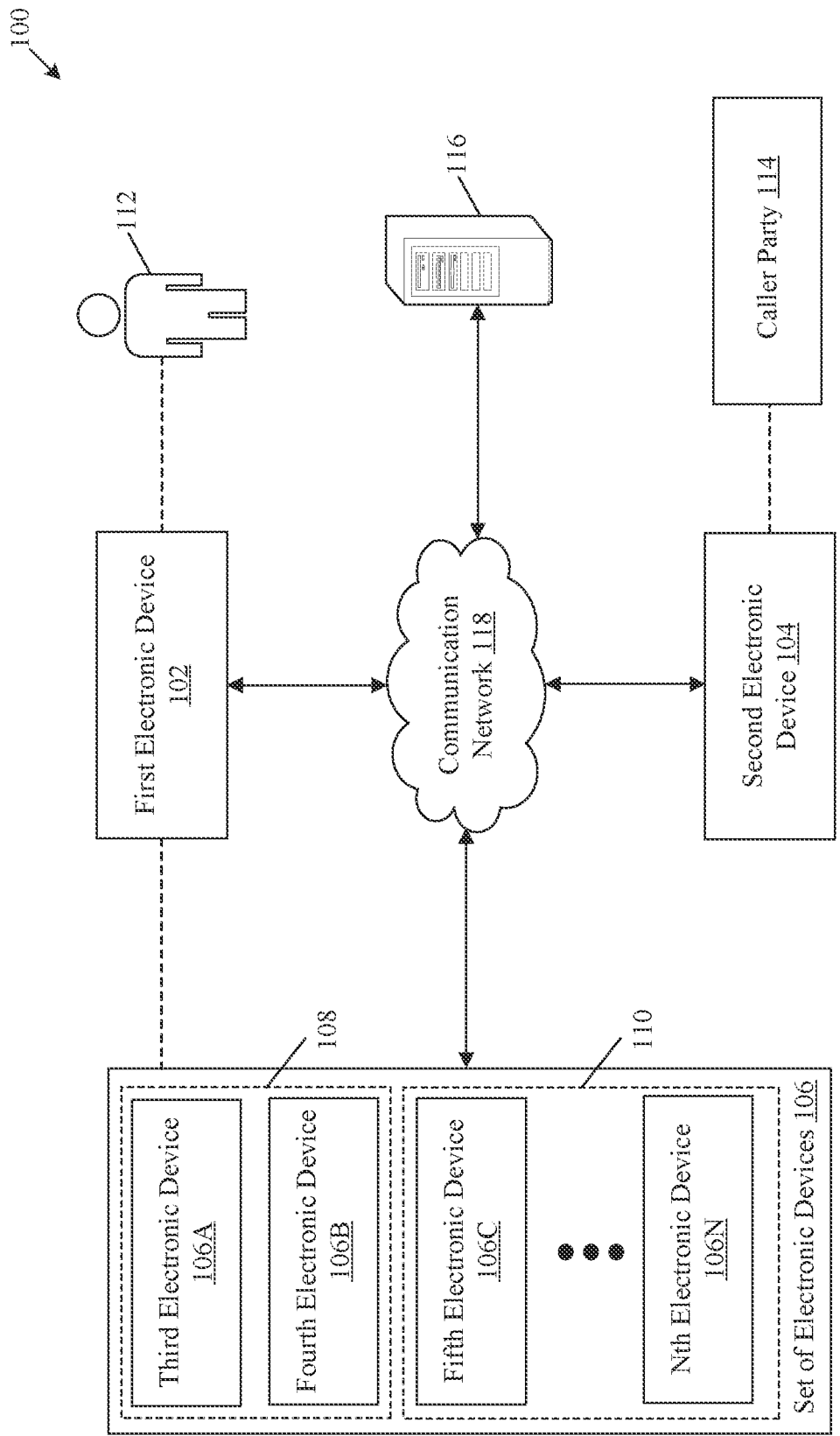
FIG. 1 is a diagram that illustrates an exemplary network environment for real-time verification of a Caller ID, in accordance with an embodiment of the disclosure.

The following described implementations may be found in the disclosed electronic device and method for verification of Caller IDs for live-human and robot call filtering, which may effectively detect and control call establishment in real-time. Exemplary aspects of the disclosure provide a first electronic device (for example, a mobile phone) that may receive a first call (for example, a telephone call) from a second electronic device (for example, another mobile phone, a communication device, a computer, etc.) associated with a caller party (for example, a person, or a computer, or a robot). The first electronic device may include Caller ID data including identification information (for example, a phone number, or a Caller ID also known as "Caller ID") of each electronic device. The Caller ID may correspond to a number or an identification (e.g., a name) of a caller party that may be displayed on an electronic device when the electronic device receives an incoming call. The electronic device may further transmit a verification message to the second electronic device to determine if the Caller ID of the second electronic device provides a traceable identity, which may be tracked by authorities, if required. Only an electronic device with a correct Caller ID may be able to receive the verification text message. The first verification text message may be transmitted within a first predefined time after the notification of an incoming first call. The first electronic device may further receive a response to the transmitted verification text message from the second electronic device. The first electronic device may further compare the received response with a pre-defined response associated with the transmitted verification message. The first electronic device may further determine whether a time of reception of the response is beyond a second predefined time after the transmission of the verification text message and further control a storage or delivery of a voicemail associated with the first call from the caller party, based on the comparison and the determination that the time of reception of the response is beyond the second predefined time. However, in case a correct response is received within the second predefined time (e.g. the phone system has not timed out the call and the call is still incoming), the electronic device may alert (e.g., through a ring) a user of an incoming call from a verified Caller ID.

The disclosed first electronic device may automatically detect whether the incoming call has a valid Caller ID or not, based on the received response. There may be a number of scenarios. In a first scenario, the Caller ID may not correspond to any real phone number, or may correspond to a real phone but not one that receives text messages and thus may reject the verification text message. In a second scenario, the Caller ID may be a real number that may be stolen from an unsuspecting user, in which case, a phone may receive a text and that phone's user may not know why the text was received. In such case, the user of the phone may either not respond or reply "no" to the text message, such as, for example, "Did you just try to call a number ended in 1234? Verification Code 'xyz'". In a third scenario, the Caller ID may be legitimate, and the user of the phone may respond "yes xyz" to the text message, such as, "Did you just try to call a number ending in 1234? Verification Code 'xyz'". It should be noted that the response may include the verification code "xyz" in the verification text in order to prevent spoofing of the response message by a telemarketer or scammer that didn't actually receive the verification text message from the first electronic device. The verification code may not be long, however, may be unique and unpredictable based on other text messages sent by the first electronic device.

The disclosed first electronic device transmits the first verification text message to the second electronic device before an establishment of the first call and within a first predefined time after the receipt of the first call. Based on the received response to the transmitted first verification text message, and the time of reception of the response from the second electronic device, the disclosed electronic device may detect whether the call has a valid Caller ID or not. Based on the detection, the disclosed first electronic device may establish the first call (and/or also alert the user of the first electronic device about the incoming first call) or re-direct the first call to the voicemail. The call establishment or re-direction to the voicemail may be executed in real-time when the first call is received from the second electronic device, based on whether the time of reception of first call is beyond a second predefined time after the transmission of the verification text message.

Conventional techniques for live-human and robot call filtering may maintain blacklisted and whitelisted caller numbers. In case of such conventional techniques, a new call from a new number, which may neither be a blacklisted nor whitelisted caller number, may be connected, irrespective of whether the new number is from a robo-caller. On the other hand, the disclosed first electronic device may operate in real-time to establish calls with genuine Caller IDs and block (or transmit to voicemail) ones that don't.

Other traditional solutions for robo-call filtering may involve automatically answering a call, and then sending a challenge question to a caller party. In case a correct response is received from the caller party, then another challenge question may be transmitted to the caller party, which may instruct the caller to call back within a specified period of time. Such solutions, though effective, may be time-consuming, and the genuine human callers may have to wait unnecessarily. Details related to such solutions are described in U.S. Pat. No. 11,108,908 B1, the text of which is incorporated herein in its entirety. Unfortunately, scammers may be human callers and may also be able to pass such challenge-response texts, such as CAPTCHA tests. Scammers may use fake Caller IDs, which may make it hard to track down and prosecute such scammers. The disclosed first electronic device may operate in real-time to identify and filter-out calls with fake Caller IDs as the call may be incoming. The disclosed first electronic device may transmit a verification text message to the caller party and If the caller party answers the verification text message correctly, e.g. "yes" with the verification code, within a specified time limit, the first electronic device (e.g., a phone) may alert (e.g., though ringing) so that the human user can pick it up and the call between the first electronic device and the second electronic device may be connected. Also, the second electronic device may be added to a list of whitelisted devices associated with the first electronic device, based on the reception of the correct response from the caller party within the specified time limit. In some scenarios, the response may be correct but may be received after the specified time limit. In such scenarios, the call may be transmitted to a voicemail and the second electronic device may still be added to a list of whitelisted devices. In such case, other calls received from the second electronic device in future may be established between the first electronic device and the second electronic device seamlessly (i.e., without a need of transmission of verification text message and text response between devices). In case the received response is incorrect, then the first electronic device (i.e., the phone) may not alert (or ring) to notify the user, and the call may be dropped or transmitted to the voicemail. In such case, the call may be detected as one with a fake Caller ID. In such scenarios, the second electronic device may be added to a list of blacklisted devices. Other calls received from the second electronic device in future may be directly transmitted to the voicemail or rejected/dropped. Thus, calls with fake Caller IDs may be effectively filtered by the disclosed first electronic device. Also, calls where the text verification response is not received in a timely way may be re-directed to the voicemail of the user of the first electronic device. Such re-direction to the voicemail may ensure that the user of the first electronic device may still receive messages of such calls, possibly calls from landline phones or phone systems that can't handle text message and not able to receive and respond to the verification text message, through the voicemail.

FIG. 1 is a diagram that illustrates an exemplary network environment for real-time verification of the Caller ID, in accordance with an embodiment of the disclosure. With reference to FIG. 1, there is shown a diagram of a network environment 100. The network environment 100 may include a first electronic device 102, and a second electronic device 104, a set of electronic devices 106, and a server 116. The set of electronic devices 106 may include a third electronic device 106A, a fourth electronic device 106B, a fifth electronic device 106C, . . . and an Nth electronic device 106N. There is further shown a first set of whitelisted devices 108 and a first set of blacklisted devices 110. In an example, the first set of whitelisted devices 108 may include the third electronic device 106A and the fourth electronic device 106B. The first set of blacklisted devices 110 may include, for example, the fifth electronic device 106C, . . . and Nth electronic device 106N. The first electronic device 102 may be associated with a user 112, who may operate the first electronic device 102. With reference to FIG. 1, there is further shown a caller party 114, which may be associated with second electronic device 104. Each electronic device (e.g., the first electronic device 102, the second electronic device 104, and the set of electronic devices 106) may be communicatively coupled to the server 116, via a communication network 118.

The N number of electronic devices shown in FIG. 1 is presented merely as an example. The disclosure may be implemented based on only one two or more than N electronic devices, without deviation from the scope of the disclosure. For the sake of brevity, only N electronic devices have been shown in FIG. 1. However, in some embodiments, there may be more than N electronic devices, without limiting the scope of the disclosure.

The first electronic device 102 may include suitable logic, circuitry, interfaces, and/or code that may be configured to receive a first call from the second electronic device 104 associated with the caller party 114. The first electronic device 102 may be further configured to determine whether the received first call is using a fake Caller ID. The first electronic device 102 may be further configured to either control an establishment of the first call between the first electronic device 102 with the second electronic device 104 by alerting the user 112 of the first electronic device 102 (such as, by ringing the phone) or control a storage or delivery of a voicemail associated with the first call from the caller party 114. The control of the establishment of the first call or the control of the storage or delivery of the voicemail may be based on the determination whether the received first call has a valid Caller ID. Examples of the first electronic device 102 may include, but are not limited to, a smartphone, a telephone, a cellular phone, a mobile phone, a personal digital assistant (PDA) device, a tablet, a gaming device, a computing device, a mainframe machine, a server, a computer work-station, an imaging device, and/or a consumer electronic (CE) device that may have a capability to initiate, receive, and process network calls.

The second electronic device 104 may include suitable logic, circuitry, interfaces, and/or code that may be configured to initiate the first call to the first electronic device 102 associated with the user 112. The second electronic device 104 may be further configured to receive a verification text message transmitted by the first electronic device 102. The second electronic device 104 may further determine a response associated with the received verification text message and transmit the determined response to the first electronic device 102. The second electronic device 104 may further control the establishment of the first call between the second electronic device 104 and the first electronic device 102. In an embodiment, the second electronic device 104 may be configured to initiate a second call to the first electronic device 102 associated with the user 112. For example, the second call may be initiated after the first call. Examples of the second electronic device 104 may include, but are not limited to, a telephone, a smartphone, a cellular phone, a mobile phone, a personal digital assistant (PDA) device, a tablet, a gaming device, a computing device, a mainframe machine, a server, a computer work-station, an imaging device, and/or a consumer electronic (CE) device that may have a capability to initiate, receive, and process network calls.

Each of the set of electronic devices 106 may include suitable logic, circuitry, interfaces, and/or code that may be configured to initiate and/or receive one or more calls from other electronic devices included in the set of electronic devices 106. In some embodiments, each of the set of electronic devices 106 may be configured to initiate and/or receive one or more calls from electronic devices other than the set of electronic devices 106. Each of the set of electronic devices 106 may have corresponding identification information (for example, a phone number or a caller ID) that may be known to (or stored on) the first electronic device 102. In an embodiment, the identification information of the second electronic device 104 associated with the caller party 114 may be unknown to (or not stored on) the first electronic device 102. In an embodiment, the second electronic device 104 may be excluded from the set of electronic devices 106. Examples of the each of the set of electronic devices 106 may include, but are not limited to, a telephone, a smartphone, a cellular phone, a mobile phone, a personal digital assistant (PDA) device, a tablet, a gaming device, a computing device, an imaging device, a mainframe machine, a server, a computer work-station, and/or a consumer electronic (CE) device that may have the capability to initiate, receive, or process network calls.

Each electronic device of the first set of whitelisted devices 108 may correspond to electronic devices that may be associated with previously identified human callers. Each call initiated from each of the first set of whitelisted devices 108 for the first electronic device 102 may be directly established with the first electronic device 102. Similar to the first set of whitelisted devices 108, each electronic device of the first set of blacklisted devices 110 may correspond to electronic devices that may be associated with previously identified fake Caller IDs or robo-callers. Each call initiated from each of the first set of blacklisted devices 110 for the first electronic device 102 may be a fake Caller ID and may not be established and may be dropped. Identification information (for example, a phone number or a caller ID) of the first set of whitelisted devices 108 and the first set of blacklisted devices 110 may be stored on the first electronic device 102.

The caller party 114 may correspond to a person (i.e., a human caller) or a computer (for example, a robo-caller) that may initiate calls, via the second electronic device 104, to the first electronic device 102. In either case, the human or robot caller may be using falsified Caller IDs. In case, the caller party 114 is the person or human caller, the first call may be considered as a genuine call by the first electronic device 102, if the Caller ID of the first call is identified as genuine. In case the caller party 114 is the computer or the robo-caller, the first call may be considered as the live-human and robot call because the live-human and robot calls that may deliver a pre-recorded message. The first electronic device 102 may transmit a live-human and robot call to a voicemail (e.g., the server 116) for later review and/or drop the live-human and robot call.

The server 116 may include suitable logic, circuitry, interfaces, and/or code that may be configured to store the first call or a second call received from the caller party 114 (via the second electronic device 104). In some embodiments, the server 116 may store a message (e.g., a voicemail message) or information (e.g., in textual format) related to the first call or the second call received from the caller party 114. The server 116 may be further configured to convert the stored first call or the second call from a first format (e.g., an audio format) to a second format (say, a textual format) to store the message or the information related to the first call or the second call. The message or the information in the second format may consume less memory size as compared to the memory size consumed by the first call or the second call in the first format (i.e., audio format). In an embodiment, the server 116 may include an audio-to-text (or speech to text) converter that may convert the first call or the second call from the audio format to the textual format. The server 116 may be further configured to transmit the converted message/information (in the textual format) of the first call or the second call to the first electronic device 102 or to an email server associated with the first electronic device 102. In some embodiments, the server 116 may transmit the first call or the second call in the audio format or as an audio attachment, (like ".wav" file). In some embodiments, the server 116 may be configured to store the identification information associated with the set of electronic devices 106 or a plurality of caller parties that may also include the caller party 114. In an embodiment, the server 116 may be further configured to the verification text message and the pre-defined response corresponding to the verification text message. The server 116 may receive a query from the first electronic device 102 for the verification text message and the pre-defined response, based on a reception of the first call by the first electronic device 102. Based on the reception of the query from the first electronic device 102, the server 116 may transmit the verification response and the pre-defined response to the first electronic device 102.

The server 116 may be implemented as a voicemail server associated with the first electronic device 102. The server 116 may also be implemented as a cloud server and may execute operations through web applications, cloud applications, HTTP requests, repository operations, file transfer, and the like. Other example implementations of the server 116 may include, but are not limited to, a call server, a database server, a file server, a web server, a media server, an application server, a mainframe server, or a cloud computing server. In at least one embodiment, the server 116 may be implemented as a plurality of distributed cloud-based resources by use of several technologies that are well known to those ordinarily skilled in the art. A person with ordinary skill in the art will understand that the scope of the disclosure may not be limited to the implementation of the server 116 and the first electronic device 102 as two separate entities. In certain embodiments, the functionalities of the server 116 can be incorporated in its entirety or at least partially in the first electronic device 102, without a departure from the scope of the disclosure. In such case, the server 116 may be considered as a local voicemail incorporated in the first electronic device 102.

The communication network 118 may include a communication medium through which the first electronic device 102, the second electronic device 104, the set of electronic devices 106, and the server 116 may communicate with each other. The communication network 118 may be a wired or wireless communication network. In some embodiments, the first electronic device 102 may receive the first call or the second call from the second electronic device 104, via the communication network 118. The communication network 118 may include a telecommunication network that may be configured to handle telephonic calls (such as the first call or the second call) between two or more electronic devices. In such case, the communication network 118 may include different telephonic networks, such as, but not limited to, a cellular network, a mobile network, a public switched telephonic network (PSTN), a radio access network (RAN) device, an integrated service digital network (ISDN), or a voice over internet protocol (VOIP) network. Other examples of the communication network 118 may include, but are not limited to, Internet, a Wireless Fidelity (Wi-Fi) network, a Personal Area Network (PAN), a Local Area Network (LAN), or a Metropolitan Area Network (MAN).

Various devices in the network environment 100 may be configured to connect to the communication network 118, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the first electronic device 102 may be configured to receive a first call from the second electronic device 104 associated with the caller party 114. The first electronic device 102 may include Caller ID data including identification information of each electronic device of the set of electronic devices 106. The identification information of each electronic device of the set of electronic devices 106 may include, but is not limited to, a telephone number (or a Caller ID) of the corresponding electronic device, a name associated with a caller party of the corresponding electronic device, live-human and robot call information associated with the caller party of the corresponding electronic device, or an organization name associated with the caller party of the corresponding electronic device. In an embodiment, the first electronic device 102 may determine the identification information of the set of electronic devices 106, based on data collected from a plurality of third-party devices or servers (not shown), such as, directory devices/servers. Such third-party devices or servers may store the identification information of a set of caller parties associated with, for example, the set of electronic devices 106. The plurality of third-parties may collect the data related to the identification information from multiple users associated with the set of caller parties or the set of electronic devices 106. In some embodiments, the identification information about the set of caller parties or the set of electronic devices 106 may be stored in the server 116. In an embodiment, the set of electronic devices 106 may include at least one of the first set of whitelisted devices 108 or the first set of blacklisted devices 110. In an embodiment, the Caller ID data associated with the second electronic device 104 (from which the first call is received) may not be included in the set of electronic devices 106. In an embodiment, identification information (e.g., a phone number or device identification) of the second electronic device 104 may be unknown to (or not stored on) the first electronic device 102). For example, the second electronic device 104 may not have established a call, initiated a call, or received a call from the first electronic device 102, prior to the first call. In such case, the first call may correspond to a first instance of telecommunication between the first electronic device 102 and the second electronic device 104. Thus, the identification information of the second electronic device 104 may not be known or stored on the first electronic device 102, prior to the receipt of the first call by the first electronic device 102 from the second electronic device 104.

The first electronic device 102 may be further configured to transmit a verification text message to the second electronic device 104 based on the received first call. In an embodiment, the first electronic device 102 may transmit the verification text message to the second electronic device 104, based on an exclusion of the second electronic device 104 from the set of electronic devices 106. The verification text message may include a unique number, e.g. a nonce, which may be considered as a verification code, that may be needed to be sent back in the response text message from the second electronic device 104. The verification text message may be transmitted to the second electronic device 104 within a first predefined time (e.g., few seconds), based on the received first call which may be incoming. At this time (i.e., the time of receipt of the first call), the first electronic device 102 (e.g., a phone) may not alert (e.g., ring) the user 112. Thus, the first predefined time may be prior to a time instant at which the first electronic device 102 may alert the user 112 about an incoming call. In an embodiment, the verification text message may indicate a second predefined time (e.g., certain seconds higher than the first predefined time) within which a response may be required to be sent from the second electronic device 104 for an establishment of the first call. Details about the verification text message, the first predefined time, and the second predefined time are provided, for example, in FIG. 3.

The first electronic device 102 may be further configured to receive a response to the transmitted verification text message. The response may be received from the second electronic device 104 and may include an answer of the transmitted verification text message. Based on the reception of the response, the first electronic device 102 may be further configured to compare the received response with a pre-defined response associated with the transmitted verification text message. In an embodiment, the received response may be compared with the pre-defined response associated with the transmitted verification text message to determine whether the received response corresponds to a correct response or not.

The first electronic device 102 may be further configured to determine whether a time of reception of the response is beyond the second predefined time after the transmission of the verification text message. In an embodiment, the second predefined time may be indicated in the transmitted verification text message. The first electronic device 102 may be further configured to control a storage or delivery of a voicemail associated with the first call from the caller party 114, based on the comparison and the determination that the time of reception of the response is beyond the second predefined time. Details about the comparison and the storage or delivery of the voicemail are provided, for example, in FIG. 3.

Figure 2:
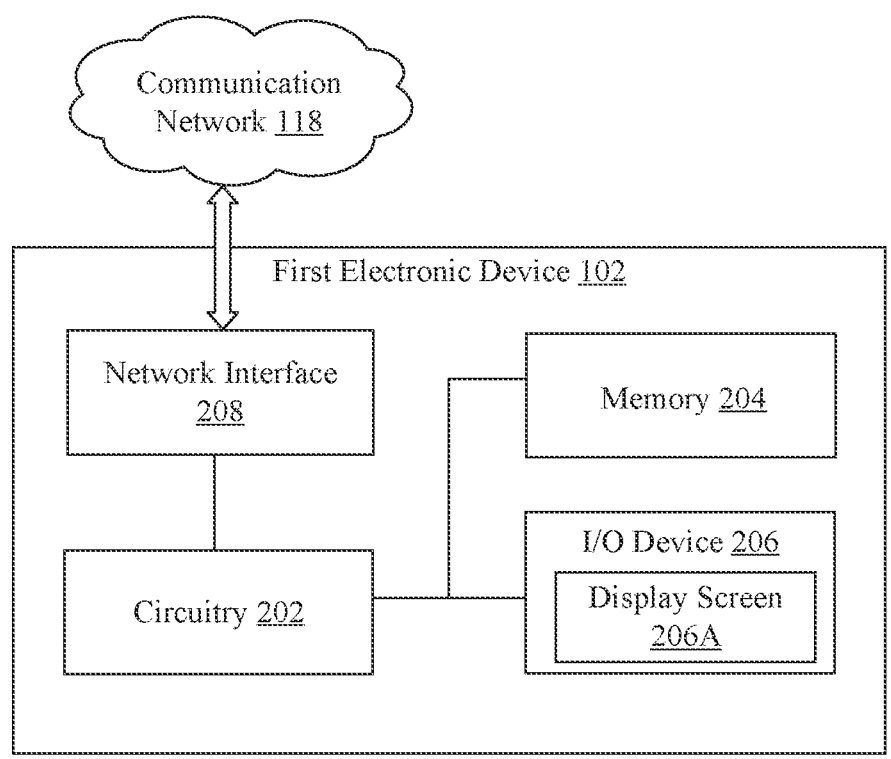
FIG. 2 is a block diagram that illustrates an exemplary electronic device for real-time verification of a Caller ID, in accordance with an embodiment of the disclosure.

FIG. 2 is a block diagram that illustrates an exemplary electronic device for real-time verification of Caller ID, in accordance with an embodiment of the disclosure. FIG. 2 is explained in conjunction with elements from FIG. 1. With reference to FIG. 2, there is shown a block diagram 200 of the first electronic device 102. The first electronic device 102 may include circuitry 202, a memory 204, an input/output (I/O) device 206, and a network interface 208. The circuitry 202 may be communicatively coupled to the memory 204, the I/O device 206, and the network interface 208. The I/O device 206 may further include a display screen 206A.

The circuitry 202 may include suitable logic, circuitry, and interfaces that may be configured to execute program instructions associated with different operations to be executed by the first electronic device 102. For example, some of the operations may include, but are not limited to, the receipt of the incoming first call, the transmission of the verification text message, the reception of the response text message, the comparison of the received response with the pre-defined response, the determination of whether the time of reception of the response is within/beyond the second predefined time, and the control of the storage or delivery of the voicemail. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored on the memory 204 may be configured to perform operations of the circuitry 202 (and/or the first electronic device 102), when executed by the circuitry 202. In at least one embodiment, the memory 204 may store information related to the first set of whitelisted devices 108 and/or the first set of blacklisted devices 110. The memory 204 may also store the Caller ID data including identification information of each electronic device of the set of electronic devices 106. The memory 204 may be further configured to store the first pre-defined time and the second pre-defined time. Also, the memory 204 may store the verification text message and the pre-defined response. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. For example, the first electronic device 102 may receive user input from the user 112, via the I/O device 206. The user input may be indicative of an instruction to accept or reject the received first call or the second call at the first electronic device 102. The first electronic device 102 may control the I/O device 206 to display an alert or notification of the received first call or the second call for the user 112. The I/O device 206, which may include various input and output devices, may be configured to communicate with the circuitry 202. Examples of the I/O device 206 may include, but are not limited to, a touch screen, a keyboard, a vibration motor, a mouse, a joystick, a microphone, a display device (such as, the display screen 206A), and a speaker.

The display screen 206A may include suitable logic, circuitry, and interfaces that may be configured to display the alert or notification of the first call or the second call. The display screen 206A may be a touch screen which may enable the user 112 to provide the user-input via the display screen 206A. The touch screen may be at least one of a resistive touch screen, a capacitive touch screen, or a thermal touch screen. The display screen 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 206A may refer to a display screen of a head mounted device (HMD), a smart-glass device, a see-through display, a projection-based display, an electro-chromic display, or a transparent display.

The network interface 208 may include suitable logic, circuitry, and interfaces that may be configured to facilitate a communication between the circuitry 202, the second electronic device 104, the set of electronic devices 106, and the server 116, via the communication network 118. The network interface 208 may be implemented by use of various known technologies to support wired or wireless communication of the first electronic device 102 with the communication network 118. The network interface 208 may include, but is not limited to, an antenna, a radio frequency (RF) transceiver, one or more amplifiers, a tuner, one or more oscillators, a digital signal processor, a coderdecoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a public switched telephonic network (PSTN), a radio access network (RAN), a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), Fifth Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The functions or operations executed by the first electronic device 102, as described in FIG. 1, may be performed by the circuitry 202. Operations executed by the circuitry 202 are described in detail, for example, in FIGS. 3 and 4.

Figure 3:
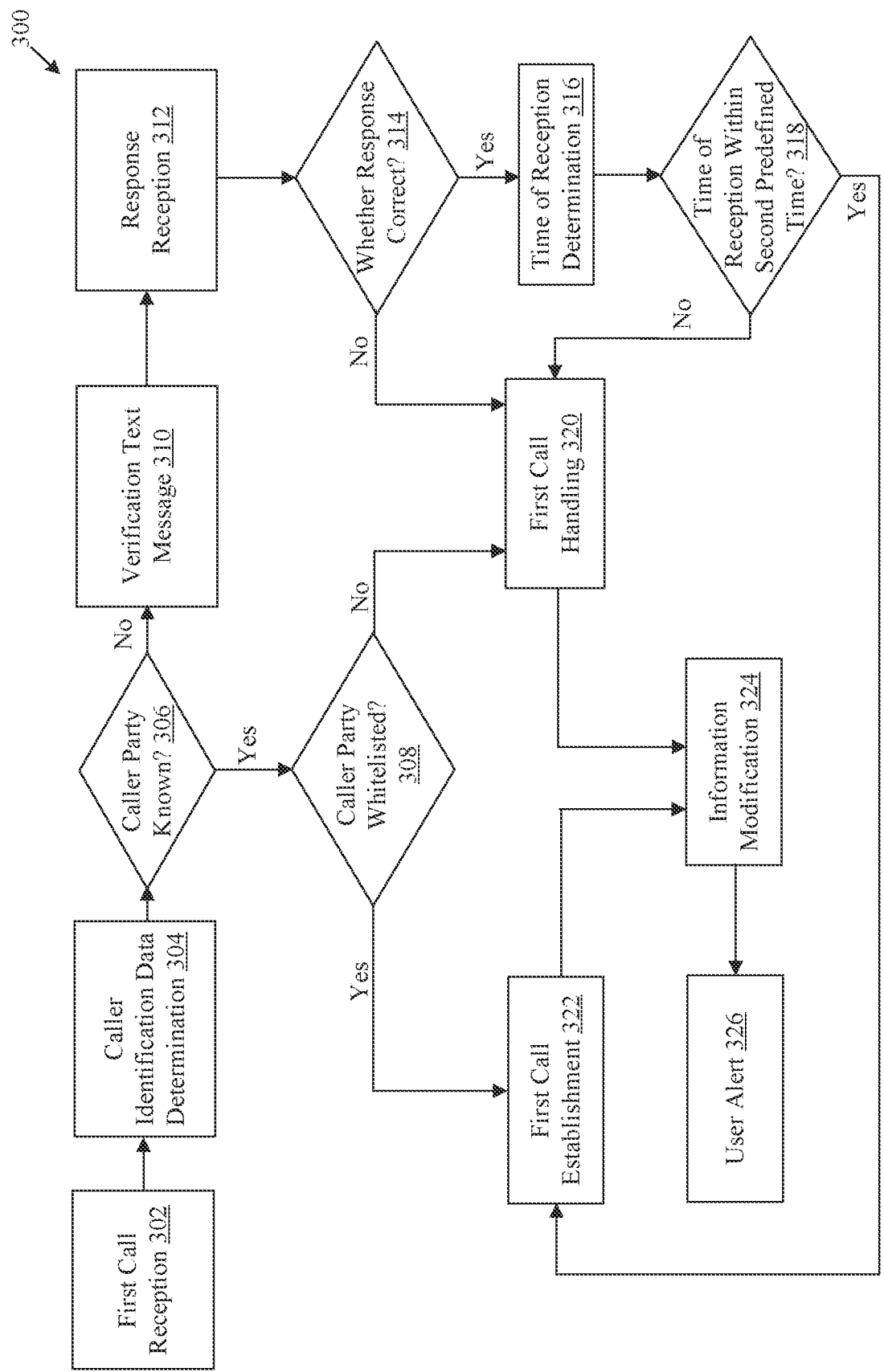
FIG. 3 is a diagram that illustrates exemplary operations for real-time verification of a Caller ID, in accordance with an embodiment of the disclosure.

FIG. 3 is a diagram that illustrates exemplary operations for real-time verification for Caller ID, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 326, as described herein. The exemplary operations illustrated in the block diagram 300 may start at 302 and may be performed by any computing system, apparatus, or device, such as by the first electronic device 102 of FIG. 1 or the circuitry 202 of FIG. 2. Although illustrated with discrete blocks, the exemplary operations associated with one or more blocks of the block diagram 300 may be divided into additional blocks, combined into fewer blocks, or eliminated, depending on the particular implementation.

At 302, a first call reception operation may be executed. In the first call reception operation, the circuitry 202 may be configured to receive the first call, as an incoming call, from the second electronic device 104, via the communication network 118. The first electronic device 102 may be associated with the user 112 and the second electronic device 104 may be associated with the caller party 114 that may be a human caller, or a computer/robot. Examples of the first call may include, but is not limited to, a phone call, a telephonic call (e.g., a PSTN call), an internet call, a VoIP call, or a chat messenger call.

In case, the first call is a live-human or robot call (wherein an automated machine corresponds to the caller party 114), until the Caller ID is verified the circuitry 202 may not alert the user 112 about the received first call. For example, the circuitry 202 may control the speaker (associated with the first electronic device 102) to suppress a sound notification, e.g., a ring or ding, associated with the incoming first call and/or may control the display screen 206A of the first electronic device 102 to not display the UI related to the incoming call (i.e., first call).

At 304, a Caller ID data determination operation may be executed. In the Caller ID data determination operation, the circuitry 202 may be configured to determine the Caller ID data. The Caller ID data may include identification information (e.g., a phone number or a device identification) of each electronic device of the set of electronic devices 106.

In another embodiment, the identification information may be associated with a set of caller parties associated with the set of electronic devices 106. As discussed above, the set of electronic devices 106 may include at least one of the first set of whitelisted devices 108 or the first set of blacklisted devices 110.

In an embodiment, the identification information may include, but is not limited to, a telephone number (e.g., caller ID) of the corresponding electronic device, a name associated with a caller party associated with the corresponding electronic device, live-human and robot call information associated with the corresponding electronic device, and an organization associated with the with the corresponding electronic device. The live-human and robot call information associated with the caller party may include information such as, a probability or indication that the received call associated with the corresponding caller party may be a live-human and robot call.

In an embodiment, information about the telephone number or the caller ID of the caller party 114 may be included in the received first call. The circuitry 202 may be configured to extract the telephone number or the caller ID of the second electronic device 104 or the caller party 114, from the received first call. The extracted telephone number or the caller ID may be considered as the identification information of the second electronic device 104 from which the first call is initiated. In some embodiments, the name of the caller party 114 may be determined as the identification information based on the extracted telephone number or the caller ID. For example, the circuitry 202 may search the telephone number (extracted from the first call), in the contact list stored in the first electronic device 102 to determine the name (i.e., identification information) of the caller party 114 from whom the first call may be originated, via the second electronic device 104. In an embodiment, the name of the caller party 114 may be included in the received first call. The name of the caller party 114 may be included in the first call by the second electronic device 104 or by the service provider associated with the first call. The circuitry 202 may extract the name of the caller party 114 from the received first call to determine the identification information.

In some embodiments, the circuitry 202 may determine the identification information (i.e., the name) of the caller party 114 based on the determined caller ID (for example, a phone number) and the data collected from a plurality of third-parties that may have the identification information (for example, the name) of the caller party 114. The plurality of third-parties may have the data that may be collected from multiple users. The data may include the identification information about the plurality of caller parties that may also include the caller party 114. For example, the multiple users (such as, the caller party 114 or the user 112) may upload or mention their corresponding data (i.e., telephone numbers or names) on different websites (such as, social networking, e-commerce, or marketing websites). The plurality of third-parties may extract the identification information of the caller party 114 based on the data extracted from such websites. The collection of the data (i.e., telephone number, names, or other personal details) from multiple or crowd of users may be referred as crowdsourcing approach performed by the plurality of third-parties. At the time of receipt of the first call, the circuitry 202 may send a request (including the call details like phone number) to one of the plurality of third-parties to provide the identification information for the first call. Based on the sent request, the circuitry 202 of the first electronic device 102 may receive the identification information (like name) of the caller party 114 or the second electronic device 104 from the one of the plurality of third-parties or a server related to the one of the plurality of third-parties.

In another embodiment, the circuitry 202 may receive the identification information of the second electronic device 104 or the caller party 114 from a server (not shown) associated with a service provider of the first electronic device 102 or from the server 116. The user 112 may be a customer of the service provider associated with the first electronic device 102. In an embodiment, the server of the service provider of the first electronic device 102 may be same as the server 116 (i.e., a voicemail server), where audio or text associated with the first call or the second call may be stored.

At 306, an operation to determine whether the caller party 114 is known to the first electronic device 102 may be executed. In such operation, the circuitry 202 may be configured to determine whether the caller party 114 is known. To determine whether the caller party 114 is known, the circuitry 202 may determine whether the second electronic device 104 is included in the set of electronic devices 106. For example, the first electronic device 102 may be configured to determine whether the determined Caller ID data associated with the second electronic device 104 is already stored in the memory 204 of the first electronic device 102. In case the determined Caller ID data associated with the second electronic device 104 is already stored in the memory 204, that the circuitry 202 may determine that the second electronic device 104 or the caller party 114 may be known to the first electronic device 102. In another example, the Caller ID data associated with the set of electronic devices 106 may be stored in the memory 204. The circuitry 202 may search the Caller ID data associated with the set of electronic devices 106 to determine whether the set of electronic devices 106 is included in the set of electronic devices 106, based on the Caller ID data determined (at 304) for the second electronic device 104. In case, the Caller ID data associated with the set of electronic devices 106 includes the identification information associated with the second electronic device 104, the second electronic device 104 may be determined to be included in the set of electronic devices 106. In such case, the caller party 114 may be determined to be known to the first electronic device 102. In case the caller party 114 is determined to be known, control may pass to 308, and. otherwise, control may pass to 310.

At 308, an operation to determine whether the caller party 114 is whitelisted may be executed. In such operation, the circuitry 202 may be configured to determine whether the caller party 114 is whitelisted, based on an inclusion of the second electronic device 104 in the first set of whitelisted devices 108 of the set of electronic devices 106. To determine whether the second electronic device 104 is included in the first set of whitelisted devices 108, the first electronic device 102 may be configured to determine whether the Caller ID data including the identification information of the second electronic device 104 is included in the Caller ID data including the identification information of each of the first set of whitelisted devices 108. In case the identification information of the second electronic device 104 is determined to be included in the identification information of the first set of whitelisted devices 108, the caller party 114 may be determined as whitelisted. In case, the caller party 114 is whitelisted, control may pass to 322. Otherwise, the second electronic device 104 may be determined to be included in the second list of blacklisted devices 110, the caller party 114 may be determined as blacklisted, and control may pass to 320.

At 310, a verification text message transmission operation may be executed. In the verification text message transmission operation, the circuitry 202 may be configured to transmit a verification text message to the second electronic device 104 (associated with the caller party 114) from which the first call may be originated or received. The verification text message may be transmitted based on the reception of the first call and a determination that the second electronic device 104 is excluded from the set of electronic devices 106 or unknown to the first electronic device 102.

In an embodiment, the verification text message may include, for example, a message (such as, "Please confirm (e.g., "Yes/No") that this call has been placed by you") and a verification code (such as, "Please send the verification code "XYZ"). Based on the transmission of the verification text message, the second electronic device 104 may be configured to receive the verification text message transmitted by the first electronic device 102.

In an embodiment, the circuitry 202 may be configured to transmit the verification text message to the second electronic device 104 before an establishment of the first call and within a first predefined time (e.g., less than a second, like 0.5 seconds) after the receipt of the first call. For example, if the first predefined time is set to 0.5 seconds and the first call is received at 05:15:15 PM, then the verification text message may be transmitted before 05:15:16 PM. The first predefined time may be prior to a time instant at which the first electronic device 102 may alert the user 112 about an incoming call (e.g., the first call).

In an embodiment, the transmitted verification text message may also indicate a second predefined time within which the response to the verification text message is to be sent by the second electronic device 104 for an establishment of the first call between the first electronic device 102 and the second electronic device 104. In an embodiment, the second predefined time may correspond to a timespan in which a human being (such as, the caller party 114) may understand the transmitted verification text message and provide a response of such verification text message. In an embodiment, the second predefined time may be different for every verification text message.

The circuitry 202 may be configured to transmit the verification text message to the second electronic device 104 to confirm the Caller ID of the caller party 114. In an embodiment, the memory 204 of the first electronic device 102 may be configured to store a plurality of verification text messages. The circuitry 202 may be configured to select one of the plurality of verification text messages from the memory 204 and transmit the selected verification text message to the second electronic device 104. In an embodiment, the circuitry 202 may randomly select the verification text message to be transmitted. In another embodiment, the circuitry 202 may select the verification text message, based on certain factors associated with the caller party 114, the second electronic device 104, or the first call. Such factors associated with the caller party 114 may include, but are not limited to, a geo-location of the second electronic device 104, an educational or work domain of the caller party 114, an age or a gender of the caller party 114, a time of the receipt of the first call, or a software or hardware capability of the second electronic device 104. In an embodiment, the factors (which may be associated with the caller party 114) that may be a basis for the selection of the verification text message, may be determined based on, for example, the determined identification information of the second electronic device 104.

At 312, a response reception operation may be executed. In the response reception operation, the circuitry 202 may be configured to receive a response of the verification text message from the second electronic device 104 associated with the caller party 114. The response may be received based on the transmitted verification text message (i.e., which may include a question for the caller party 114 to answer). In an embodiment, the second electronic device 104 may be configured to receive the verification text message that may be transmitted by the first electronic device 102. Based on the received verification text message, the second electronic device 104 may be configured to determine the response associated with the received verification text message.

In an embodiment, the second electronic device 104 may be configured to receive an input from the caller party 114, as the response. The input may correspond to, but is not limited to, a press of a button, an audio response, or a touch-based input provided by a human user (e.g., the caller party 114) based on the verification text message.

In another embodiment, the second electronic device 104 may be configured to determine the response automatically (without any user-input of the caller party 114) based on received verification text message. For example, for the verification text message, like "Please enter a one-time password (OTP) received on your device", the second electronic device 104 may be configured to extract the OTP that may be received on the second electronic device 104 from the first electronic device 102 or a third-party server. The second electronic device 104 may further enter the extracted OTP, as the response, without user intervention and further transmit the determined response to the first electronic device 102.

At 314, an operation to determine whether the response received from the second electronic device 104 (i.e., associated with the caller party 114) is correct may be executed. To determine whether the response received from the second electronic device 104 is correct, the circuitry 202 may be configured to compare the received response with a pre-defined response associated with the transmitted verification text message. The pre-defined response associated with the transmitted verification text message may correspond to a correct response of the transmitted verification text message. The circuitry 202 may be configured to determine whether the received response is same as the pre-defined response. In case the received response is same as the pre-defined response, then the received response may be determined as the correct response and control may pass to 316. Otherwise, the received response may be determined as an incorrect response and control may pass to 320.

At 316, an operation to determine a time of reception may be executed. In the time of reception determination operation, the circuitry 202 may be configured to determine a time of reception of the response, to the transmitted verification text message, from the second electronic device 104. The time of reception may indicate a timestamp at which the response may be received by the first electronic device 102.

At 318, an operation to determine whether the determined time of reception of the response is within a second pre-defined time may be executed. In an embodiment, the circuitry 202 may be configured to compare the time of reception of the response with the second predefined time to determine whether the determined time of reception of the response is within the second predefined time after the transmission of the verification text message.

In an embodiment, the second predefined time may correspond an absolute timestamp (such as "05:15:50" PM). In such a scenario, the circuitry 202 may be configured to compare the time of reception of the response with the second predefined time to determine whether the reception of the response is beyond the second predefined time. In another embodiment, the second predefined time may correspond a time-interval (such as, few seconds, like 30 seconds). In such case, the circuitry 202 may be configured to determine a second timestamp from the first predefined time (at which the verification text message was transmitted to the second electronic device 104). Such second timestamp may correspond to the second predefined time. For example, if the verification text message was transmitted to the second electronic device 104 at "05:15:20" PM and the time interval is 30 seconds, then the second timestamp may be "05:15:50" PM. In such case, the circuitry 202 may be configured to compare the determined time of reception of the response with the second timestamp. In case the determined time of reception is determined to be beyond the second timestamp, control may pass to 320. Otherwise, control may be pass to 322.

In case the response is received within the second pre-defined time, the first electronic device 102 may be configured to transmit an acknowledgement of the transmitted response to the second electronic device 104. The second electronic device 104 may receive the acknowledgement from the first electronic device 102 and control an establishment of the first call between the second electronic device 104 and the first electronic device 102, based on the receipt of the acknowledgement of the transmitted response. The establishment of the first call is discussed further, for example, at 322.

At 320, a first call handling operation may be executed. In the first call handling operation, the first electronic device 102 may be configured to handle the first call from the second electronic device 104. In an embodiment, the handling of the first call may correspond to a transfer of the first call to the server 116 (i.e., a voicemail) for storage. In another embodiment, the handling of the first call may correspond to a dropping of the first call. In an embodiment, the first electronic device 102 may be configured to handle the first call based on the determination (at 308) that the second electronic device 104 is included in the first set of blacklisted devices 110. In another embodiment, the first electronic device 102 may handle the first call based on the determination (at 314) that the received response is incorrect. In another embodiment, the first electronic device 102 may handle the first call based on a determination that the received response is correct but the time of reception of the response from the second electronic device 104 is beyond the second predefined time (as may be determined at 318). For example, the circuitry 202 may be configured to control a storage or delivery of a voicemail associated with the first call from the caller party 114, based on the comparison (i.e., in case the response is correct) and the determination that the time of reception of the response is beyond the second predefined time (as determined at 318). In such case, the first call may be transmitted to the server 116 for storage as a voicemail on the server 116. The user 112 (or the second electronic device 104) may be able to retrieve such voicemail associated with the first call at the later date/time as per a convenience of the user 112.

In an embodiment, the server 116 may be configured to store the first call (in a first format, such as an audio format). The server 116 may convert the received first call (or the second call) from the audio format to a second form (say, a textual format) and may further store the converted first call (or the second call) to save memory space in the server 116.

In an embodiment, the circuitry 202 may transmit a request to the server 116 to retrieve the first call (i.e., the voicemail associated with the first call) from the server 116. The server 116 may be configured to convert the stored first call from the first format (e.g., an audio format) to the second format (e.g., a text format) based on the request received from the first electronic device 102. The second format may correspond to, but is not limited to, a textual format. In an embodiment, the server 116 may include a speech-to-text conversion engine (not shown) that may generate the textual transcript of the first call or the second call (in the audio format). It may be noted that a file size of the second format may be less than the file size of the first format. Therefore, information related to the calls stored in the second format may consume less memory than information related to the calls stored in the first format. The server 116 may transmit the converted information related to the first call (in the second format) to the first electronic device 102 (or an email server associated with the first electronic device 102). In some embodiments, the server 116 may retrieve the stored first call or the second call and transmit the retrieved first call/second call to the first electronic device 102 (or an email server associated with the first electronic device 102) in the audio format (i.e., without conversion), based on the request received from the first electronic device 102.

At 322, a first call establishment operation may be executed. In the first call establishment operation, the first electronic device 102 may be configured to control an establishment of the first call between the first electronic device 102 and the second electronic device 104. In an embodiment, the first electronic device 102 may control the establishment of the first call, based on the reception of the correct response within the second predefined time (as may be determined at 318). In another embodiment, the first electronic device 102 may be configured to establish the first call between the first electronic device 102 and the second electronic device 104, based on a determination that the caller party 114 associated with the set of electronic devices 106 exists in the first set of whitelisted devices 108 (as may be determined at 308). The operation 322 may be executed in case the time of reception of the response is determined to be within the second predefined time at 318.

At 324, an information modification operation may be executed. In the information modification operation, the first electronic device 102 may be configured to update information associated with the set of electronic devices 106. The information associated with the set of electronic devices 106 may be updated based on the establishment of the first call (at 322) and the handling of the first call (at 320). In an embodiment, the first electronic device 102 may be configured to update information about the first set of whitelisted devices 108 to further include information about the second electronic device 104, based on the control of the storage or delivery of the voicemail associated with the first call from the caller party 114. For example, the information about the first set of whitelisted devices 108 may be updated to include the second electronic device 104, in case control passes to 322 from 318 (i.e., when the correct response is received, however, the time of reception of the response is beyond the second predefined time). The first electronic device 102 may further update the Caller ID data to further include identification information of the second electronic device 104 based on the updated information about the first set of whitelisted devices 108. The first set of whitelisted devices 108 may already include the second electronic device 104 in case the caller party 114 is determined as whitelisted at 308, and subsequently control passes from 308 to 322. In such case, operation 324 may be not be required, and thus, may be skipped.

In another embodiment, the first electronic device 102 may further update information about the first set of blacklisted devices 110 to include the second electronic device 104 based on the comparison of the received response with the pre-defined response and a determination that the received response corresponds to an incorrect response. The first electronic device 102 may further update the Caller ID data to further include identification information of the second electronic device 104 based on the updated information about the first set of blacklisted devices 110. Such updated information may be used to handle or establish a second call from the second electronic device 104 at a future time. It may be noted that the information about the first set of blacklisted devices 110 may be updated to include the second electronic device 104, in case control passes to 320 from 314 (i.e., when an incorrect response is received). The first set of blacklisted devices 110 may already include the second electronic device 104 in case the caller party 114 is determined as blacklisted at 308, and subsequently control passes from 308 to 320. In such case, operation 324 may be not be required, and thus, may be skipped.

Further, the first electronic device 102 may receive a second call. The second call may be from the second electronic device 104 and may be received at a time after the time of the reception of the first call. Based on the reception of the second call, the first electronic device 102 may be configured to determine the Caller ID data associated with the second electronic device 104. The first electronic device 102 may further determine whether the Caller ID data associated with the second electronic device 104 is included in the updated first set of whitelisted devices 108 or in the updated first set of blacklisted devices 110. The circuitry 202 may be configured to control the establishment of the second call between the first electronic device 102 and the second electronic device 104, based on the updated Caller ID data. In case, the second electronic device 104 is included in the updated first set of whitelisted devices 108, then the circuitry 202 may be configured to control the establishment of the second call between the first electronic device 102 and the second electronic device 104 to connect the call. In such case, the second call may be established between the first electronic device 102 and the second electronic device 104 seamlessly without a need to transmit the verification text message. However, in case the second electronic device 104 is included in the updated first set of blacklisted devices 110, then the circuitry 202 may be configured to control the establishment of the second call to transfer the second call to the voicemail or drop the second call. The inclusion of the second electronic device 104 in the updated first set of blacklisted devices 110 may indicate that the second call that originates from the second electronic device 104 may correspond to a potential live-human and robot call.

At 326, a user alert operation may be executed. In the user alert operation, the circuitry 202 may be configured to alert the user 112 about the receipt of the first call. In an embodiment, the user 112 may be alerted in both the cases, including when the call is established or when the call is handled (i.e., transferred to the voicemail or dropped). In case, the first call is established between the first electronic device 102 and the second electronic device 104, the circuitry 202 may control the display screen 206A of the first electronic device 102 to display a user interface (UI) on which the caller ID of the second electronic device 104 may be displayed. In some embodiments, the UI may also display information such as a name, work details, etc. associated with the caller ID of the incoming first call. Such information (i.e., name) may be stored in the contact list of the first electronic device 102 corresponding to the caller ID or retrieved from the plurality of third-party sources. The UI may also include a plurality of UI elements to assist the user 112 to accept or reject the incoming first call. In some embodiments, the circuitry 202 may also control the speaker associated with the first electronic device 102 to output a particular sound that may alert the user 112 about the incoming first call or any other subsequent call. In some other embodiments, the first electronic device 102 may also control a vibration motor installed in the first electronic device 102 to vibrate to further alert or notify the user 112 about the incoming first call or any other subsequent call.

In case, control is transferred to 324 from 320, the first electronic device 102 may control the display screen 206A (in FIG. 2) of the first electronic device 102 to display a notification that indicates the first call (or any other subsequent call) has been transmitted to the voicemail or has been dropped. In an embodiment, the first electronic device 102 may also display a reason for call drop or transmission to the voicemail. For example, the reasons may include, but are not limited to, an inclusion of the second electronic device 104 in the first set of blacklisted devices 110, a receipt of an incorrect response to the verification text message, or a receipt of a correct response to the verification text message but beyond the second predefined time.

Conventional techniques for live-human and robot call filtering may maintain blacklisted and whitelisted caller numbers. In case of such conventional techniques, a new call from a new number, which may neither be blacklisted nor whitelisted caller numbers, may be connected, irrespective of whether the new number is from a robo-caller. On the other hand, the disclosed first electronic device 102 may operate in real-time to establish calls with verified Caller IDs and block (or transmit to voicemail) calls with unverified Caller IDs.

Other traditional solutions for robo-call filtering may involve a transmission of a challenge question to a caller party. In case a correct response is received from the caller party, then another challenge question may be transmitted to the caller party, which may instruct the caller to call back within a specified period of time. Such solutions may be time-consuming, and the genuine human callers may have to wait unnecessarily. The disclosed first electronic device 102 may operate in real-time to identify and filter-out potential live-human and robot calls from the genuine human callers, when the call is received. The disclosed first electronic device 102 may transmit a verification text message to the caller party (e.g., the caller party 114) and if the caller party 114 answers the verification text message correctly within a specified time limit (e.g., the second predefined time), the call (e.g., the first call) between the first electronic device 102 and the second electronic device 104 may be connected. Also, the second electronic device 104 may be added to a list of whitelisted devices (e.g., the first set of whitelisted devices 108) associated with the first electronic device 102, based on the reception of the correct response from the caller party 114 within the specified time limit (i.e., the second predefined time). In some scenarios, the response may be correct but may be received after the specified time limit (i.e., the second predefined time). In such scenarios, the call (e.g., the first call) may be transmitted to a voicemail (e.g., the server 116) and the second electronic device 104 may still be added to a list of whitelisted devices (i.e., the first set of whitelisted devices 108) as discussed at 320. Other calls (for example, the second call) from the second electronic device 104 in future may be established between the first electronic device 102 and the second electronic device 104 seamlessly (i.e., without a need of transmission of verification text message and responses between devices). In case the received response is incorrect, then the first call may be dropped or transmitted to the voicemail. In such case, the first call may be detected as a potential live-human and robot call. In such scenarios, the second electronic device 104 may be added to a list of blacklisted devices (e.g., the first set of blacklisted devices 110). Other calls from the second electronic device 104 in future may be directly transmitted to the voicemail or rejected/dropped. Thus, the live-human and robot calls may be effectively filtered by the disclosed first electronic device 102. Also, the live-human and robot calls or calls for which the verification response is not timely responded may be re-directed to the voicemail of the user 112 of the first electronic device 102. Such re-direction to the voicemail may ensure that the user of the first electronic device may still receive messages of such calls through the voicemail.

Figure 4:
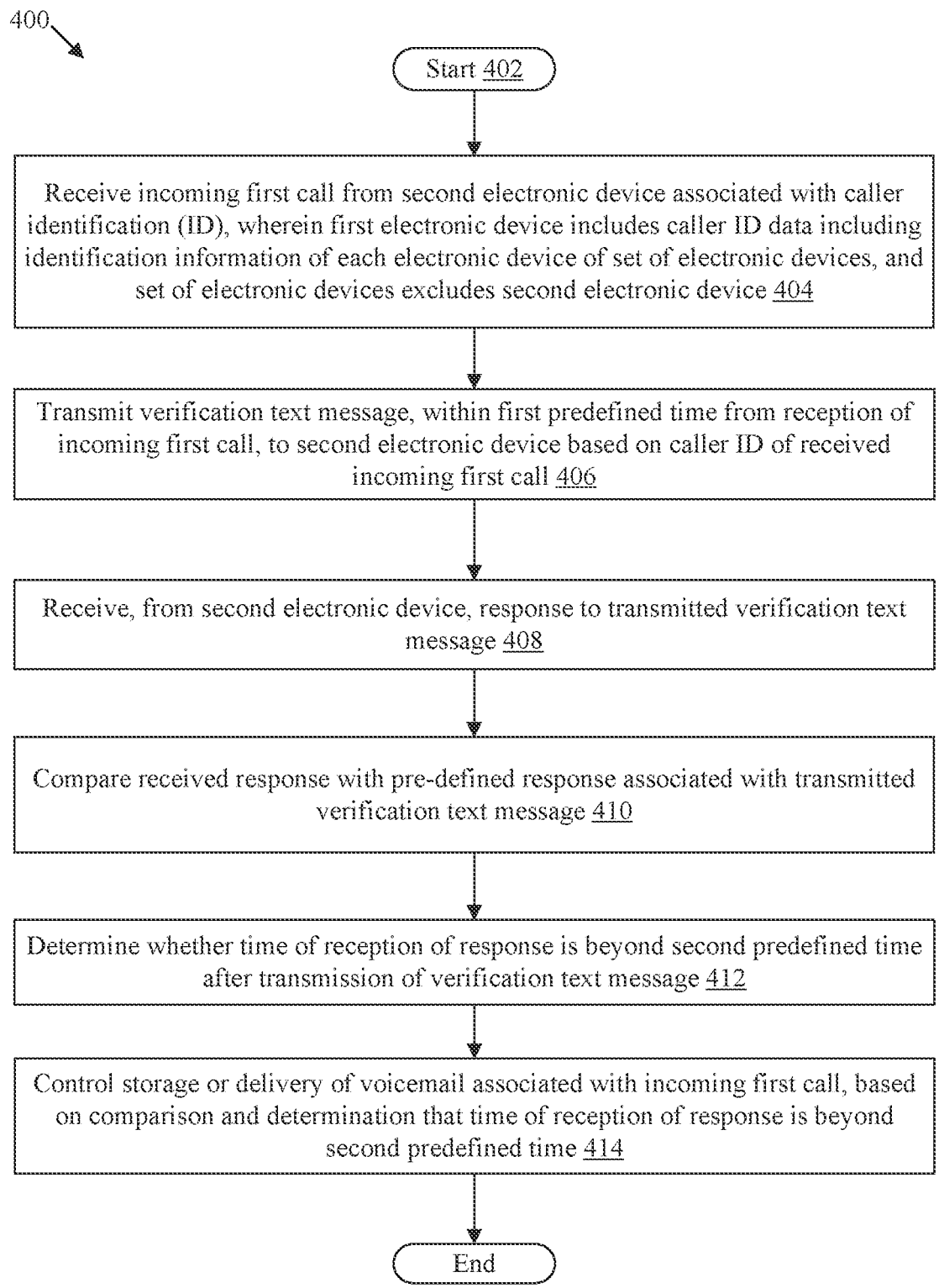
FIG. 4 is a flowchart that illustrates exemplary operations for real-time verification of a Caller ID, in accordance with an embodiment of the disclosure.

FIG. 4 is a flowchart that illustrates exemplary operations for real-time verification of Caller ID, in accordance with an embodiment of the disclosure. FIG. 4 is explained in conjunction with elements from FIGS. 1, 2, and 3. With reference to FIG. 4, there is shown a flowchart 400. The operations from 402 to 414 may be implemented by any computing system, such as by the first electronic device 102 of FIG. 1 or circuitry 202 of FIG. 2. The operations may start at 402 and may proceed to 404.

At 404, the incoming first call may be received from the second electronic device 104 that may be associated with a Caller ID (that may be associated with the caller party 114), wherein the first electronic device 102 may include the Caller ID data including the identification information of each electronic device of the set of electronic devices 106, and wherein the set of electronic devices 106 may exclude the second electronic device 104. In at least one embodiment, the circuitry 202 may be configured to receive the first call from the second electronic device 104 associated with the caller party 114, wherein the first electronic device 102 may include the Caller ID data including the identification information of each electronic device of the set of electronic devices 106, and wherein the set of electronic devices may exclude the second electronic device 104. The reception of the first call is described further, for example, in FIG. 3 (at 302). Details related to the Caller ID data and a determination whether the caller party 114 is known to the first electronic device 102 are described further, for example, in FIG. 3 (at 304 and 306, respectively).

At 406, the verification text message may be transmitted to the second electronic device 104 within the first predefined time from the reception of the incoming first call, based on the received incoming first call. In at least one embodiment, the circuitry 202 may be configured to transmit the verification text message, within the first predefined time (e.g., few seconds like 10 seconds) from the reception of the incoming first call, to the second electronic device 104, based on the received first call. In an embodiment, the verification text message may include, for example, a message (such as, "Please confirm (e.g., "Yes/No") that this call has been placed by you") and a verification code (such as, "Please send the verification code "XYZ"). Details about the transmission of the verification text message and the first predefined time are provided, for example, in FIG. 3 (at 310).

At 408, the response to the transmitted verification text message may be received from the second electronic device 104. In at least one embodiment, the circuitry 202 may be configured to receive the response to the transmitted verification text message from the second electronic device 104. In an embodiment, the second electronic device 104 may be configured to determine the response based on a user input from the caller party 114. In another embodiment, the second electronic device 104 may be configured to determine the response automatically (without any user-input of the caller party 114), based on received verification text message. The second electronic device 104 may be configured to transmit the determined response to the first electronic device 102. The reception of the response to the transmitted verification text message is described, for example, in FIG. 3 (at 312).

At 410, the received response may be compared with the pre-defined response associated with the transmitted verification text message. In at least one embodiment, the circuitry 202 may be configured to compare the received response with the pre-defined response associated with the transmitted verification text message. The pre-defined response associated with the transmitted verification text message may correspond to a correct response of the transmitted verification text message. In case the received response matches the pre-defined response, the received response may be determined as the correct response, otherwise the received response may be determined as an incorrect response. Details about the comparison of the received response with the pre-defined response are provided, for example, in FIG. 3 (at 314).

At 412, it may be determined whether the time of reception of the response is beyond the second predefined time (e.g., few seconds like 10 seconds) after the transmission of the verification text message. In at least one embodiment, the circuitry 202 may be configured to determine whether the time of reception of the response is beyond the second predefined time after the transmission of the verification text message. The time of reception of the response may be determined and compared with the second predefined time to determine whether the time of reception of the response is beyond the second predefined time. Details about the determination of whether the time of reception of the response and the second predefined time are provided, for example, in FIG. 3 (at 316 and 318).

At 414, the storage or delivery of the voicemail associated with the incoming first call (from the caller party 114 with the Caller ID) may be controlled based on the comparison and the determination that the time of reception of the response is beyond the second predefined time. In an embodiment, the circuitry 202 may be configured to control the storage or delivery of the voicemail associated with the incoming first call (from the caller party 114 with the Caller ID), based on the comparison and the determination that the time of reception of the response is beyond the second predefined time as described, for example, in FIG. 3 (at 320). Control may pass to end.

Various embodiments of the disclosure may provide a non-transitory computer-readable medium and/or storage medium having stored thereon, instructions executable by a machine and/or a computer (such as, the first electronic device 102). The instructions may cause the machine and/or computer to perform operations that include a reception of a first call from a second electronic device (such as, the second electronic device 104) associated with a Caller ID of a caller party (such as, the caller party 114). The first electronic device 102 may include Caller ID data including identification information of each electronic device of a set of electronic devices (such as, the set of electronic devices 106). The set of electronic devices 106 may exclude the second electronic device 104. The operations may further include a transmission of a verification text message to the second electronic device 104 based on the Caller ID of the received incoming first call. The verification text message may be transmitted within a first predefined time after the receipt of the incoming first call. The operations may further include a reception of a response to the transmitted verification text message from the second electronic device 104. The operations may further include a comparison of the received response with a pre-defined response associated with the transmitted verification text message. The operations may further include a determination of whether the time of reception of the response is beyond a second predefined time after the transmission of the verification text message. The operations may further include a control of a storage or delivery of a voicemail associated with the incoming first call (from the caller party 114 with the Caller ID), based on the comparison, and the determination that the time of reception of the response is beyond the second predefined time.

Exemplary aspects of the disclosure may include a first electronic device (such as, the first electronic device 102 of FIG. 1) that may include circuitry (such as, the circuitry 202) that may be communicatively coupled to a memory (such as, the memory 204 of FIG. 2). The circuitry 202 may be configured to receive an incoming first call from a second electronic device (such as, the second electronic device 104 of FIG. 1) associated with a Caller ID of a caller party (such as, the caller party 114 of FIG. 1). The first electronic device 102 may include Caller ID data including identification information of each electronic device of a set of electronic devices (such as, the set of electronic devices 106 of FIG. 1). The set of electronic devices 106 may exclude the second electronic device 104 and may include at least one of a first set of whitelisted devices (such as, the first set of whitelisted devices 108 of FIG. 1) or a first set of blacklisted devices (such as, the first set of blacklisted devices 110 of FIG. 1). The circuitry 202 may be further configured to transmit a verification text message to the second electronic device 104 based on the caller ID of the received incoming first call within a first predefined time from the reception of the incoming first call. The verification text message may include. The verification text message may include information to be sent back in the response message by the second electronic device 104, for verification of the second electronic device 104. The verification text message may include the second predefined time within which the response is to be sent by the second electronic device 104 for an establishment of the incoming first call between the first electronic device 102 and the second electronic device 104.

In accordance with an embodiment, the circuitry 202 may be configured to receive a response to the transmitted verification text message from the second electronic device 104. The circuitry 202 may further compare the received response with a pre-defined response associated with the transmitted verification text message. The circuitry 202 may further determine whether the received response corresponds to a correct response, based on the comparison of the received response with the pre-defined response associated with the transmitted verification text message. The circuitry 202 may further determine whether a time of reception of the response is beyond a second predefined time after the transmission of the verification text message. The circuitry 202 may further control a storage or delivery of a voicemail associated with the first call from the caller party, based on the comparison and the determination that the time of reception of the response is beyond the second predefined time.

In accordance with an embodiment, the circuitry 202 may be further configured to control an establishment of the first call between the first electronic device 102 and the second electronic device 104, based on the reception of the correct response and that the determined time of reception is within the second predefined time.

In accordance with an embodiment, the circuitry 202 may be configured to update information about the first set of whitelisted devices 108 to further include the second electronic device 104, based on the control of the storage or delivery of the voicemail associated with the first call from the caller party. The circuitry 202 may be further configured to update the Caller ID data to further include identification information of the second electronic device 104, based on the updated information about first set of whitelisted devices 108. The circuitry 202 may be further configured to receive, from the second electronic device 104, a second call after the receipt of the first call. The circuitry 202 may further control an establishment of the second call between the first electronic device 102 and the second electronic device 104, based on the updated Caller ID data.

In accordance with an embodiment, the circuitry 202 may be further configured to update information about the first set of whitelisted devices 108 to further include the second electronic device 104, based on the control of the establishment of the first call. The circuitry 202 may be further configured to update the Caller ID data to further include identification information of the second electronic device 104, based on the updated information about the first set of whitelisted devices 108. In an embodiment, the circuitry 202 may be further configured to receive, from the second electronic device 104, a second call after the receipt of the first call. The circuitry 202 may be further configured to control the establishment of the second call between the first electronic device 102 and the second electronic device 104, based on the updated Caller ID data.

In accordance with an embodiment, the circuitry 202 may be further configured to update information about the first set of blacklisted devices 110 to further include the second electronic device 104, based on the comparison of the received response with the pre-defined response and a determination that the received response corresponds to an incorrect response. The circuitry 202 may be further configured to update the Caller ID data to further include identification information of the second electronic device, based on the updated information about the first set of blacklisted devices 110. The circuitry 202 may be further configured to receive, from the second electronic device 104, a second call after the receipt of the first call and control an establishment of the second call between the first electronic device 102 and the second electronic device 104, based on the updated Caller ID data.

In accordance with an embodiment, the second electronic device 104 may be further configured to receive the verification text message transmitted by the first electronic device 102. The second electronic device 104 may further determine the response associated with the received verification text message. The second electronic device 104 may further transmit the determined response to the first electronic device 102. The second electronic device 104 may further receive, from the first electronic device, an acknowledgement of the transmitted response based on a determination that the response is received within the second predefined time and may control the establishment of the first call between the second electronic device 104 and the first electronic device 102 based on the receipt of the acknowledgement of the transmitted response.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A first electronic device, comprising:
   circuitry is configured to:
   receive an incoming first call from a second electronic device associated with a Caller identification (ID), wherein
   the first electronic device includes Caller ID data including identification information of each electronic device of a set of electronic devices, and
   the set of electronic devices excludes the second electronic device;
   transmit a verification text message, within a first predefined time from the reception of the incoming first call, to the second electronic device based on the Caller ID of the received incoming first call;
   receive, from the second electronic device, a response to the transmitted verification text message;
   compare the received response with a pre-defined response associated with the transmitted verification text message;
   determine whether a time of reception of the response is beyond a second predefined time after the transmission of the verification text message; and
   control at least one of a storage or a delivery of a voicemail associated with the incoming first call, based on the comparison and the determination that the time of reception of the response is beyond the second predefined time.

2. The first electronic device according to claim 1, wherein the set of electronic devices includes at least one of a first set of whitelisted devices or a first set of blacklisted devices.

3. The first electronic device according to claim 2, wherein the circuitry is further configured to:
update information about the first set of whitelisted devices to further include the second electronic device, based on the control of the at least of the storage or the delivery of the voicemail associated with the incoming first call; and
update the Caller ID data to further include identification information of the second electronic device, based on the updated information about the first set of whitelisted devices.

4. The first electronic device according to claim 3, wherein the circuitry is further configured to:
receive, from the second electronic device, an incoming second call after the receipt of the incoming first call; and
control an establishment of the incoming second call between the first electronic device and the second electronic device, based on the updated Caller ID data.

5. The first electronic device according to claim 2, wherein the circuitry is further configured to:
determine whether the received response corresponds to a correct response, based on the comparison of the received response with the pre-defined response associated with the transmitted verification text message; and
control an establishment of the incoming first call between the first electronic device and the second electronic device, based on the reception of the correct response and the determination that the time of reception of the response is within the second predefined time.

6. The first electronic device according to claim 5, wherein the circuitry is further configured to:
update information about the first set of whitelisted devices to further include the second electronic device, based on the control of the establishment of the incoming first call; and
update the Caller ID data to further include identification information of the second electronic device, based on the updated information about the first set of whitelisted devices.

7. The first electronic device according to claim 6, wherein the circuitry is further configured to:
receive, from the second electronic device, an incoming second call after the receipt of the incoming first call; and
control the establishment of the incoming second call between the first electronic device and the second electronic device, based on the updated Caller ID data.

8. The first electronic device according to claim 2, wherein the circuitry is further configured to:
update information about the first set of blacklisted devices to further include the second electronic device, based on the comparison of the received response with the pre-defined response and a determination that the received response corresponds to an incorrect response; and
update the Caller ID data to further include identification information of the second electronic device, based on the updated information about the first set of blacklisted devices.

9. The first electronic device according to claim 8, wherein the circuitry is further configured to:
receive, from the second electronic device, an incoming second call after the receipt of the incoming first call; and
control an establishment of the incoming second call between the first electronic device and the second electronic device, based on the updated Caller ID data.

10. The first electronic device according to claim 1, wherein the second electronic device:
receives the verification text message transmitted by the first electronic device,
determines the response associated with the received verification text message,
transmits the determined response to the first electronic device,
receives, from the first electronic device, an acknowledgement of the transmitted response based on a determination that the response is received within the second predefined time, and
controls an establishment of the incoming first call between the second electronic device and the first electronic device based on the receipt of the acknowledgement of the transmitted response.

11. The first electronic device according to claim 1, wherein the verification text message comprises information to be sent back in the response transmitted by the second electronic device, for verification of the second electronic device.

12. The first electronic device according to claim 1, wherein the verification text message indicates the second predefined time within which the response is to be sent by the second electronic device for an establishment of the incoming first call between the first electronic device and the second electronic device.

13. A method, comprising:
in a first electronic device:
receiving an incoming first call from a second electronic device associated with a Caller identification (ID), wherein
the first electronic device includes Caller ID data including identification information of each electronic device of a set of electronic devices, and
the set of electronic devices excludes the second electronic device;
transmitting a verification text message, within a first predefined time from the reception of the incoming first call, to the second electronic device based on the caller ID of the received incoming first call;
receiving, from the second electronic device, a response to the transmitted verification text message;
comparing the received response with a pre-defined response associated with the transmitted verification text message;
determining whether a time of reception of the response is beyond a second predefined time after the transmission of the verification text message; and
controlling at least one of a storage or a delivery of a voicemail associated with the incoming first call, based on the comparison and the determination that the time of reception of the response is beyond the second predefined time.

14. The method according to claim 13, wherein the set of electronic devices includes at least one of a first set of whitelisted devices or a first set of blacklisted devices.

15. The method according to claim 14, further comprising:
    updating information about the first set of whitelisted devices to further include the second electronic device, based on the control of the at least of the storage or the delivery of the voicemail associated with the incoming first call; and
    updating the Caller ID data to further include identification information of the second electronic device, based on the updated information about the first set of whitelisted devices.

16. The method according to claim 15, further comprising:
    receiving, from the second electronic device, an incoming second call after the receipt of the incoming first call; and
    controlling an establishment of the incoming second call between the first electronic device and the second electronic device, based on the updated Caller ID data.

17. The method according to claim 14, further comprising:
    determining whether the received response corresponds to a correct response, based on the comparison of the received response with the pre-defined response associated with the transmitted verification text message; and
    controlling an establishment of the incoming first call between the first electronic device and the second electronic device, based on the reception of the correct response and the determination that the time of reception of the response is within the second predefined time.

18. The method according to claim 17, further comprising:
    updating information about the first set of whitelisted devices to further include the second electronic device, based on the control of the establishment of the incoming first call; and
    updating the Caller ID data to further include identification information of the second electronic device, based on the updated information about the first set of whitelisted devices.

19. The method according to claim 18, further comprising:
    receiving, from the second electronic device, an incoming second call after the receipt of the incoming first call; and
    controlling the establishment of the incoming second call between the first electronic device and the second electronic device, based on the updated Caller ID data.

20. A non-transitory computer-readable medium having stored thereon computer implemented instructions that, when executed by a first electronic device, causes the first electronic device to execute operations, the operations comprising:
    receiving an incoming first call from a second electronic device associated with a Caller identification (ID), wherein
        the first electronic device includes Caller ID data including identification information of each electronic device of a set of electronic devices, and
        the set of electronic devices excludes the second electronic device;
    transmitting a verification text message, within a first predefined time from the reception of the incoming first call, to the second electronic device based on the caller ID of the received incoming first call;
    receiving, from the second electronic device, a response to the transmitted verification text message;
    comparing the received response with a pre-defined response associated with the transmitted verification text message;
    determining whether a time of reception of the response is beyond a second predefined time after the transmission of the verification text message; and
    controlling at least one of a storage or a delivery of a voicemail associated with the incoming first call, based on the comparison and the determination that the time of reception of the response is beyond the second predefined time.

\* \* \* \* \*